Dec. 2, 1969 L. H. SICHEL, JR., ET AL 3,482,214

BUFFERING OF CONTROL WORD AND DATA WORD SYSTEM MEMORY TRANSFERS IN A COMMUNICATIONS CONTROL MODULE

Filed Oct. 3, 1966

8 Sheets-Sheet 1

INVENTORS.
LEONARD H. SICHEL, JR
HENRY R. HALLMAN
THOMAS MARRA

BY George L. Kensinger

ATTORNEY

INVENTORS.
LEONARD H. SICHEL, JR.
HENRY R. HALLMAN
THOMAS MARRA
BY George L. Kensinger
ATTORNEY Dec. 2, 1969 L. H. SICHEL, JR., ET AL 3,482,214

BUFFERING OF CONTROL WORD AND DATA WORD SYSTEM MEMORY TRANSFERS IN A COMMUNICATIONS CONTROL MODULE

Filed Oct. 3, 1966 8 Sheets-Sheet 3

INVENTORS.
LEONARD H. SICHEL, JR.
HENRY R. HALLMAN
THOMAS MARRA

BY George L. Kensinger
ATTORNEY

INVENTORS.
LEONARD H. SICHEL, JR.
HENRY R. HALLMAN
THOMAS MARRA
BY George L. Kensinger
ATTORNEY INVENTORS.
LEONARD H. SICHEL, JR.
HENRY R. HALLMAN
THOMAS MARRA
BY George L. Kensinger
ATTORNEY INVENTORS.
LEONARD H. SICHEL, JR.
HENRY R. HALLMAN
THOMAS MARRA
BY George L. Kensinger
ATTORNEY INVENTORS.
LEONARD H. SICHEL, JR.
HENRY R. HALLMAN
THOMAS MARRA
BY George L. Kensinger
ATTORNEY

| JOB TAGS | | | | |
|---|---|---|---|---|
| DR1 | DR2 | ICU TO LCU | LCU TO ICU | LCU TO LCU |
| 0 | 0 | CONTINUE PROCESSING | END OF WORD | CONTINUE PROCESSING |
| 0 | 1 | DEACTIVATE | RETURN DESCRIPTOR AND DATA-NO FPL | DEACTIVATE |
| 1 | 0 | ACTIVATE | RETURN DESCRIPTOR ONLY | ACTIVATE |
| 1 | 1 | ILLEGAL | RETURN DESCRIPTOR AND DATA-FPL | DESC. REQUESTED NOT YET RECEIVED |

221

223

| DR 3,4,5,6 | PER LINE STATUS | |
|---|---|---|
| 0000 | BLOCK COMPLETED SUCCESSFULLY | |
| 1000 | FRAMING ERROR | |
| 0100 | INPUT-EIGHT BIT CHAR. ONLY | PARITY ERROR |
| | | ILLEGAL CHAR. |
| | OUTPUT-DBM DETECTED COMPARISON ERROR | |
| 0010 | DMB-NO SERVICE | |
| 0001 | DDM OVERLOAD INFLUENCED THIS LINE | |
| 1110 | DDM MEMORY PARITY ERROR INFLUENCED THIS LINE | |

225

| LCU TAGS | | |
|---|---|---|
| DR13 | OUTPUT | DEACTIVATE |
| DR13 | INPUT | UPSHIFT/DOWNSHIFT |
| DR14 | INPUT | EDM,EOLB,DM CHARACTER RECEIVED DURING LAST SERVICE OF THIS LINE |
| DR14 | OUTPUT | ACTIVATE |
| DR15 | INPUT | RCC CHARACTER RECEIVED DURING LAST SERVICE OF THIS LINE |
| DR15 | OUTPUT | DO NOT SEND SPECIAL INSTRUCTIONS |
| DR16 | OUTPUT | REPEAT THE SAME WORD |

227

| DR 25,26,27 | OPERATION CODES |
|---|---|
| 000 | ILLEGAL OPERATION CODE. INDICATES INACTIVE LINE WHEN IN PER LINE RETURNED VIA IPL |
| 001 | SPECIAL INSTRUCTION 1 |
| 010 | SPECIAL INSTRUCTION 3 |
| 011 | NO SPECIAL INSTRUCTION |
| 100 | DEACTIVATE LINE |
| 101 | SPECIAL INSTRUCTION 2 |
| 110 | REPEAT WORD-OUTPUT LINES ONLY |
| 111 | BAUDOT CONVERSION |

229

| FORMATS | | | |
|---|---|---|---|
| DR 28,29,30 | BITS/ CHAR. | CHAR./ WORD | BITS/ SAMPLE |
| 000 | 6 | 6 | 1 |
| 001 | 6 | 8 | 1 |
| 010 | 6 | 6 | 6 |
| 011 | 6 | 8 | 6 |
| 100 | 8 | 6 | 8 |
| 101 | 6 | 8 | 8 |
| 111 | 8 | 6 | 8 |

Fig. 6B

*INVENTORS.*
LEONARD H. SICHEL, JR.
HENRY R. HALLMAN
THOMAS MARRA
BY George L. Kensinger
ATTORNEY United States Patent Office 3,482,214

Patented Dec. 2, 1969

3,482,214
BUFFERING OF CONTROL WORD AND DATA WORD SYSTEM MEMORY TRANSFERS IN A COMMUNICATIONS CONTROL MODULE

Leonard H. Sichel, Jr., Bryn Mawr, and Henry R. Hallman, Norristown, Pa., and Thomas Marra, Cherry Hill, N.J., assignors to Burroughs Corporation, Detroit, Mich., a corporation of Michigan Filed Oct. 3, 1966, Ser. No. 583,589
Int. Cl. G11b *13/00;* G06f *1/00, 7/00*
U.S. Cl. 340—172.5 14 Claims

ABSTRACT OF THE DISCLOSURE

A communications control module having storage registers or a memory which includes a first-in-first-out buffer stack for temporarily storing control words and data words awaiting transfer to another memory of a data processing or communication switching system to which it is coupled and addressable locations for storing linked control word system memory addresses.

This invention relates to electronic data processing and relates more specifically to an improved method and apparatus for the control of information transfers between slowly operating input-output devices and communications terminals and the main memory of data communications systems to which they may be coupled.

The buffering of control word and data word system memory transfers provided by the subject invention is useful in communications control modules or subsystems having registers or a memory for storing channel control words or descriptors specifying words or blocks of data to be transferred to and from a system main memory and data buffers for word or character assembly/disassembly operations. Such communications control modules or interface subsystems are sometimes coupled to bit-serial input devices, output devices, and full duplex communication lines or channels through a plurality of line termination character assembly/disassembly units and line scanning apparatus. Data exchange or transfer operations between such devices and data buffer locations in communications control unit memories are effected in bytes or characters of information, either serially or in parallel. The input-output devices ordinarily serviced by such communications control units are teletypewriting machines, keyboard input devices, printers and record card punch and reader machines.

Periodic scanning of each input-output channel at least once in every scan cycle permits the greatest number of input-output devices to be serviced by a communications control module since most of such devices transfer data periodically at internally controlled frequencies specific to themselves. The higher speed channels may be scheduled for data transfer service as many times as required within each complete scan cycle, which will provide service thereof at any desired multiple of the service frequency granted to the lowest speed line or channel. The maximum duration of a complete scan cycle is, therefore, determined by the maximum interval or period which may elapse between successive data transfers on the slowest input-output device or channel. Each of the channels is scanned or serviced at least once within each complete scan cycle, or as many times as is necessary to compensate for differential frequencies of operation.

If the internal memory of a communications control subsystem is used both for the storage of channel control words or descriptors and as data buffer locations for character assembly/disassembly operations, then time must be provided for access to the communications control unit memory for exchanging down-counted or exhausted control words, new control words and full data words with the system main memory. Full data words are, of course, assembled or needed for distribution much more frequently within the service of a block of data on a channel than does it become necessary to return exhausted or end-of-block control words to, and obtain new control words from, the system main memory. Internal memory access for full data word transfer to or from a system main memory becomes necessary for each channel typically after six, eight or twelve character transfers, while end-of-block memory access becomes necessary after approximately five-hundred, one-thousand or more character transfer operations.

It may, therefore, be possible during a complete scan cycle to scan and transfer a character or byte to or from several input-output channels before reaching a channel which requires end-of-word or end-of-block transfers between the communications memory and the main memory of a data processing or data communications system in which it is connected. It is inefficient, however, to perform these end-of-word or end-of-block transfers between the internal memory and the system memory in real/time, or as they occur, since this would prevent the desired regularity or periodicity in the transfer of data on the input-output lines. Such service also requires an internal memory access for the transfer of a character or byte of information to or from the associated data buffer in the internal memory.

Real/time service of end-of-word and end-of-block system memory transfers is inefficient and limiting of the number of input-output lines that can be serviced as a result also of the waiting for the completion of any system memory access cycle or operation which is in process by another unit such as a processor or other unit or module. Also involved is the system memory access time interval necessary for accomplishing the end-of-word or end-of-block transfer with a system memory, itself.

System memory access waiting intervals may be even longer in duration in modular computer systems such as that illustrated in the co-pending Lynch et al. application, Ser. No. 313,591, filed on Oct. 3, 1963, for "Store and Forward Message Switching System Utilizing a Modular Data Processor," now U.S. Patent No. 3,302,182, which may incorporate a plurality of such communications control or data demand modules as well as a plurality of input-output modules. An arrangement for priority of access to the system memory modules must be established in such a system for high speed magnetic tape units, disc file storage units, line printers and card readers which may result in a further increase in the system memory access waiting interval for the lower priority communications control modules.

Typically, there will be required one system memory access with an associated system memory access waiting interval for end-of-word transfers of full data words to or from the system main memory and three system memory accesses with the associated three access waiting intervals for the return of exhausted or end-of-block channel control words or descriptors to the system main memory, the transfer of a full data word, and the obtaining of a new per line channel control word or descriptor in end-of-block service.

Accordingly, it is an object of the present invention to increase the efficiency of communications control units and to increase the number of input-output lines or channels that may be serviced by such control units.

A further object of this invention is to provide regular or periodic data transfer service of input and output channels by a communications control module having an internal memory and regular or periodic access to the internal memory thereof for data word assembly and disassembly of the data transferred by such service.

Another object of this invention is to avoid delays in the scanning of input-output lines or channels which would be incurred by communications control modules as a result of waiting for system memory access to effect end-of-word and end-of-block transfers of full data words and transfers of new and exhausted or down-counted channel control words or descriptors with a system main memory.

In the preferred embodiment of the present invention a communications control module for use in an electronic data communications system having a main memory for controlling input and output data transfers between the system memory and a plurality of input-output devices comprises local memory means having locations for storing a channel control word and a data word buffer for each communication channel or device, a system memory interface control unit coupled to the local memory means and the system main memory for transferring control words and full data words therebetween, a line control unit coupled to the local memory means and having means for scanning each of the input-output communication channels for transferring bytes or characters of data between the input-output devices and the local memory means, and local memory control means for granting substantially periodic local memory access to the communications lines or channels through the line control unit as they are scanned and for permitting local memory access by the interface control unit, intermediate between the grant of local memory access to the line control unit for successive communication channels, of sufficient duration for the performance of a portion of the transfer steps in end-of-word and end-of-block full data word and control word transfers between the local memory means and the system main memory. Said local memory control means is further effective to permit a single cycle local memory access by the system memory interface control unit between the granting of local memory access to the line control unit for successive or adjacent communications channels and a double cycle local memory access when no transfer is effected upon the immediately preceding or the succeeding communication line or channel that is scanned.

This granting of substantialy periodic local memory access for data transfers on successive communication channels with interspersed local memory accesses by the system memory interface control unit for performing end-of-word and end-of-block full data word and control word or descriptor transfers is, however, limited in efficiency. The occurrence of closely spaced in time end-of-word or end-of-block conditions on adjacent or successively scanned communication channels would require that the scanning be stopped in order that such program service could be completely effected on the first of the channels requiring such service and that such service for a succeeding channel could begin without disrupting the former. Stopping the scanning operation for completion of end-of-word or end-of-block full data word and control word program service would cause delay to be incurred in the full scan cycle as a result of waiting for access to the system memory by the interface control unit of the communications control module. This, again, would limit the total number of input-output channels which could be serviced by such a communications control module.

Accordingly, it is another object of the subject invention to buffer control word and data word system memory transfers in a communications control module having an internal memory and to perform control word or program service in a series of steps distributed over several portions of the scan cycle or over several scan cycles if needed.

A further object of the invention is to temporarily store in the local memory of a communications control module requests for new control words or output data words and down-counted or end-of-block control words and full input data words that are to be transferred between the local memory of the control module and the main memory of the system in which it is used.

A still further object of the subject invention is to provide buffering for a full output data word for each of the output channels to be serviced and to provide in the local memory unit storage for a system memory address for each of the communication lines at which the next control word to be executed by the communications control module for the specified communications channel resides for enabling the transfer of linked blocks of input-output data on any of the channels.

Accordingly, the communications control module local memory means in the preferred embodiment of the present invention further comprises a first-in-first-out stack for the storage of down-counted control wards and full input data words which are inserted in the stack by the line control unit upon the occurrence of end-of-word and end-of-block conditions and which are removed and acted upon by the system memory interface control unit in a series of steps as it is permitted access to the local memory means. The local memory means of the communication control module also comprise locations for the storage of at least one full output data word for each of the output channels which is received from the system memory to be distributed by the communications control module. The local memory means of the communications control module may further include locations for the storage of a system memory address for each of the communication lines at which the next control word to be executed by the communications control module for the specified communications channel resides for enabling the transfer of linked blocks of input-output data on any of the channels.

Further in accordance with the subject invention, each new channel control word or descriptor which is provided by the scheduling program in an electronic data processing or communications system in which the communications control module of the subject invention is utilized for transfer to the local memory of the communications control module may include a field for storing the system memory address at which the next control word for the associated channel resides for enabling the transfer of linked blocks of the input-output data on any of the channels.

Further objects and advantages of the subject invention, as well as a more detailed description of the method and apparatus thereof for buffering control word and data word system memory transfers in a communications control module, and of the organization, mode of operation and operational features thereof, are described hereinafter with reference to the accompanying drawings, wherein:

FIG. 1 is a schematic block diagram illustrating an exemplary modular interconnection configuration of a plurality of the communications control or data demand modules of the subject invention and the manner in which they may be connected to a plurality of data buffer modules and to a data transfer bus for connection to the system memory and data processor units of electronic data processing systems;

Figure 5A:
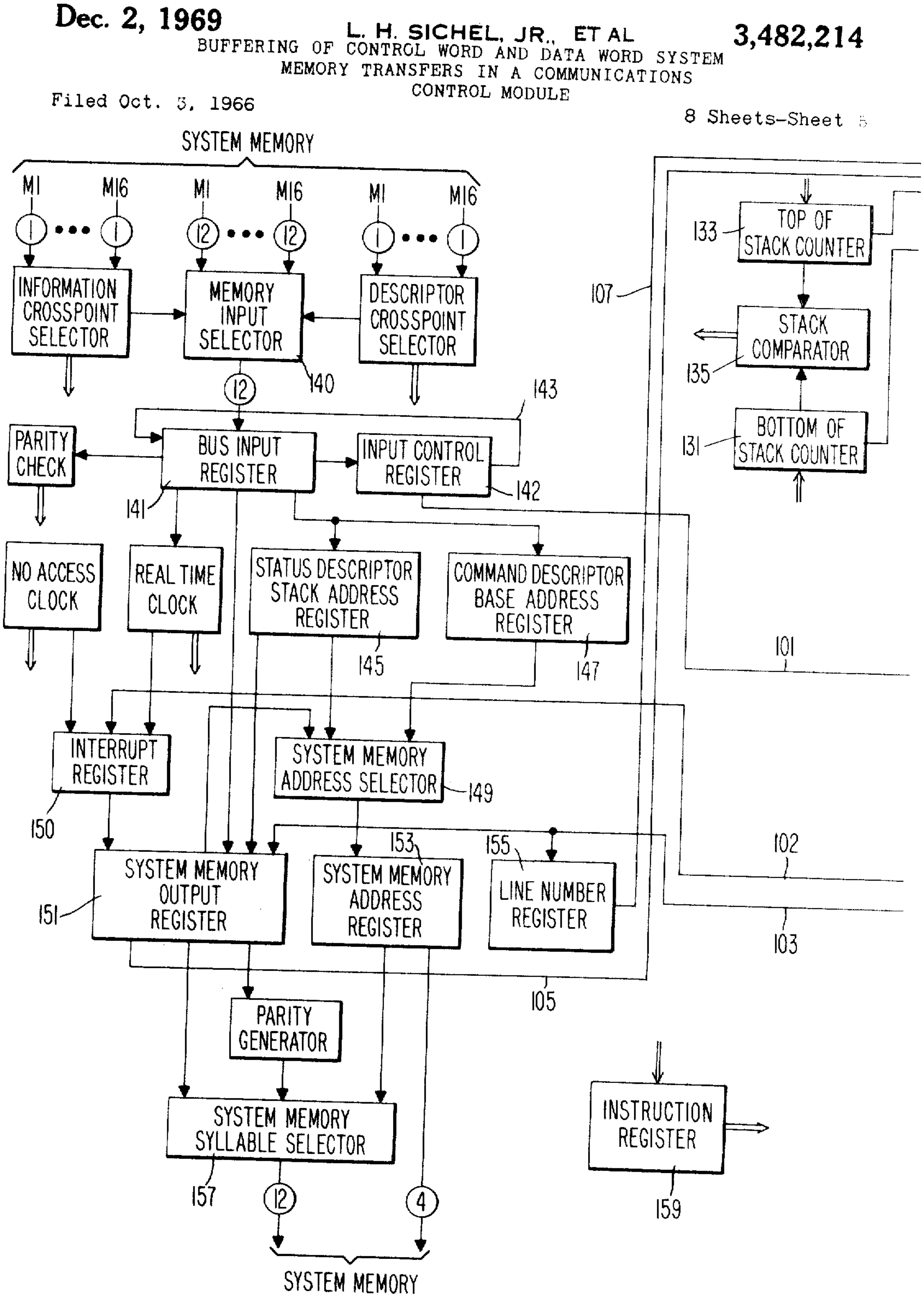
Figure 5B:
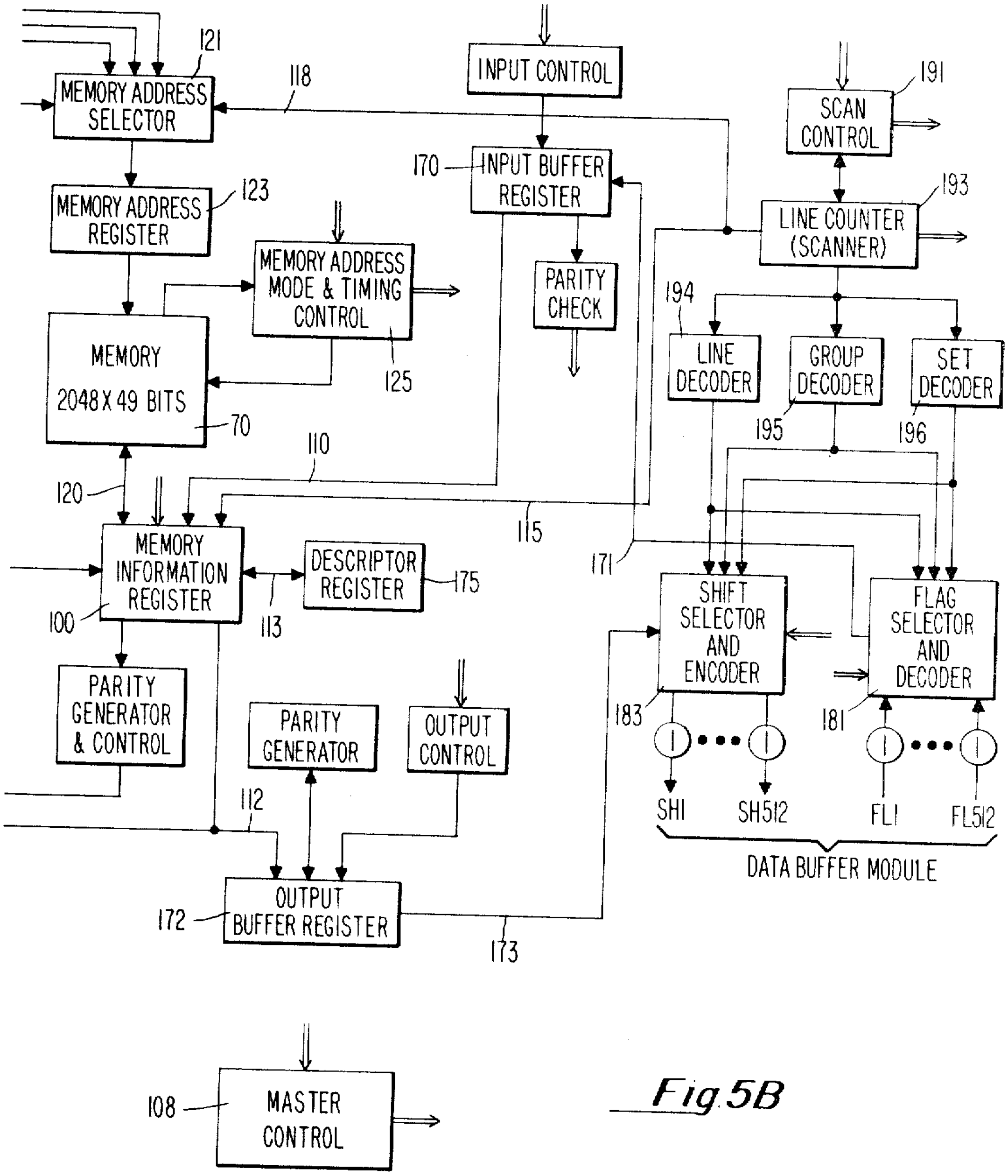
Figure 5:
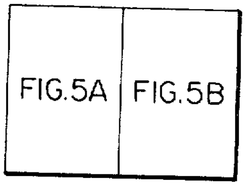
Figure 6A:
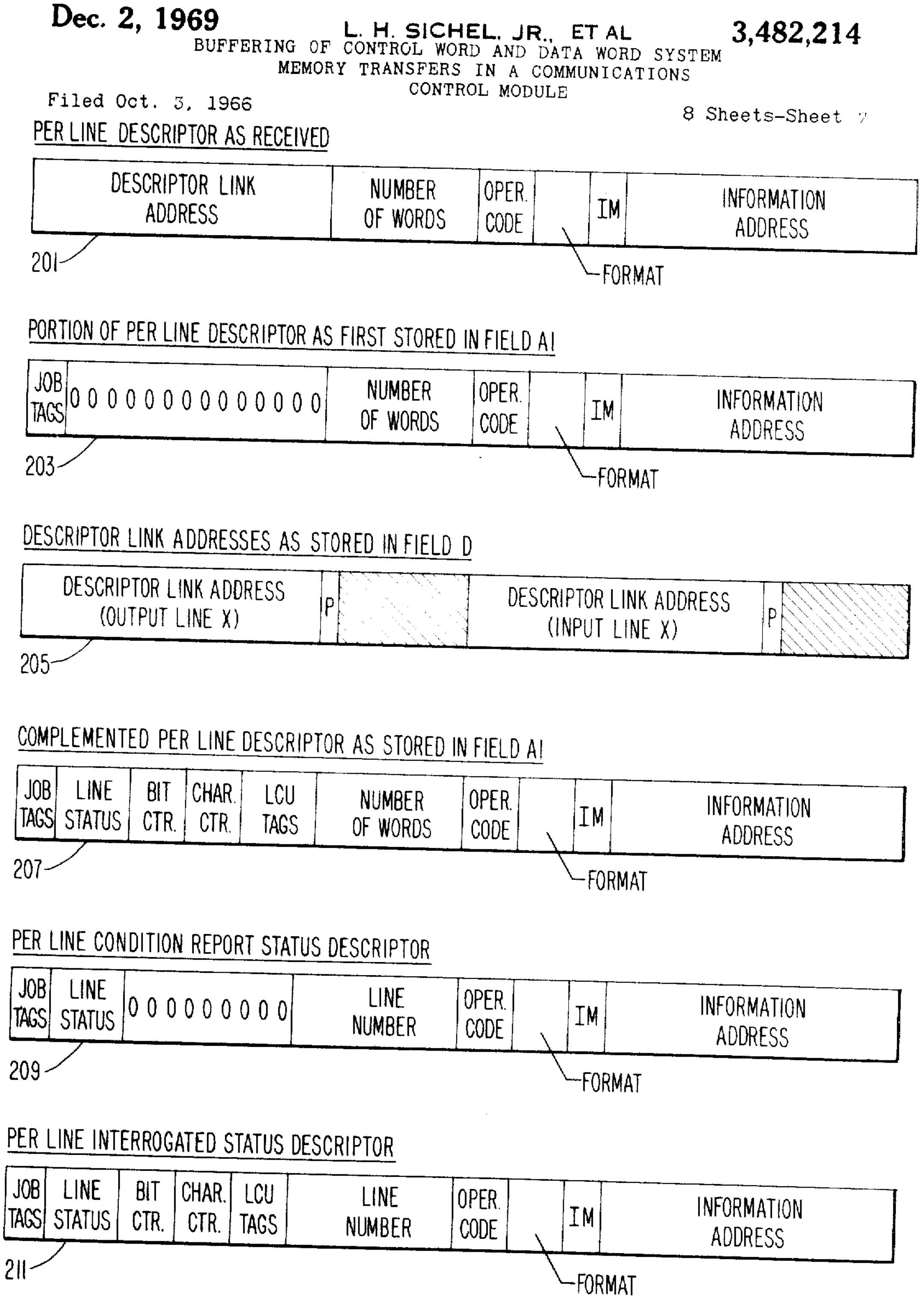

FIGS. 5A and 5B, when fitted together as shown in FIG. 5, provide a detailed schematic block diagram of a communications control or data demand module constructed in accordance with the subject invention; and FIGS. 6A and 6B illustrate per line channel control words or descriptors and information and instructions which may be transmitted thereby for use in the communications control module of the subject invention.

Figure 1:
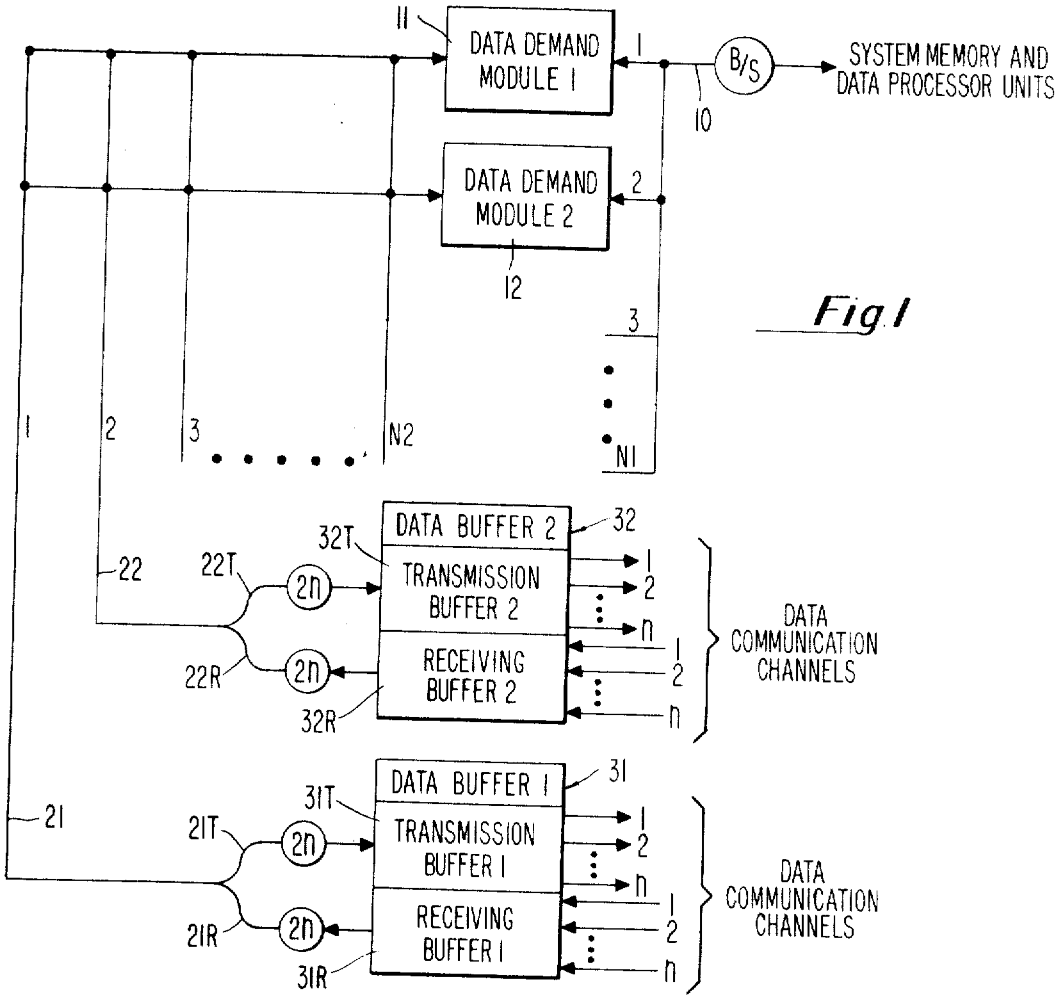

Referring more particularly to FIGURE 1, there is shown in schematic block diagram form, a modular configuration in which a plurality of communications control modules 11, 12, etc. labeled data demand module 1, 2 . . . N1 are connected for controlling information transfers between data buffer modules 31, 32, etc. labeled data buffer 1, 2 . . . N2 and a data bus 10 to the system memory and data processor unit of an electronic data processing system. Each data buffer module 31, 32 is comprised of a transmission buffer 31T, 32T and a receiving buffer 31R, 32R, each of which are coupled to a plurality of data communication channels 1, 2 . . . *n*.

The data communication channels serviced by this subsystem may include simplex input devices, simplex output devices and full duplex communications channels or devices, and will accordingly be connected to either a transmission buffer, a receiving buffer or to both a transmission buffer and a receiving buffer.

Each of the transmission buffers 31T, 32T are connected to the data demand modules by a cable of 2 *n* conductors 21T, 22T, there being one conductor for transmitting shift signals and bits of data to the corresponding output channels from a data demand module through the transmission buffer at different times, and a conductor for each of the channels to transmit output ready or flag signals back to the data demand modules. Similarly, each of the receiving buffers 31R, 32R is connected to the data demand modules by a cable 21R, 22R consisting of at least 2 *n* conductors, one for transmitting shift signals from a data demand module to the receiving buffer and one for transmitting input ready or flag signals and, later, bits of data back to the data demand modules.

Each conductor of the cables 21, 22 from the data buffer modules 31, 32 is connected to every one of the data demand modules 1, 2 . . . N1, in a modular configuration such as that shown in FIGURE 1. Since the different data buffer modules are ordinarily connected for serving different but equal numbers of input-output devices or channels the total number of input-output channels to be serviced divided by the number of channels that may be connected to each data buffer module will determine the number N2 of the data buffer modules which are required in the system. In such a determination, any input or output channel that operates at a higher frequency than the slowest channel and is thus assigned two or more intervals for data transfer within each scan cycle, is treated as equivalent to that number of lower speed channels in this calculation. Thus, differential scanning of input-output devices of different speed can readily be provided in such a modular configuration of communications control or data demand modules.

Data bus 10 connecting the data demand modules 1, 2 . . . N1 to the system memory and data processing units, if any, in the system consists of at least a number of conductors equal to the number of bits in each system memory transfer syllable (B/S), which may be less than or equal to a word of information or data. In the preferred embodiment data bus 10 consisted of 12 conductors for parallel transmission of syllables equal to one-fourth of a full information word. An effective total of 512 channels were services by such a modular configuration, there being an effective 256 input channels and an effective 256 output channels. Each data buffer module was capable of servicing 144 communication channels and there were, therefore, four data buffer modules employed for servicing the 512 input-output channels. At least two communications control or data demand modules were utilized for providing a redundant back-up in case of failure of one of them. The capability of the data bus system permitted the use of up to five such data demand modules in the system as is further described in the above-identified Lynch et al. U.S. Patent application Ser. No. 313,591.

Figure 2:
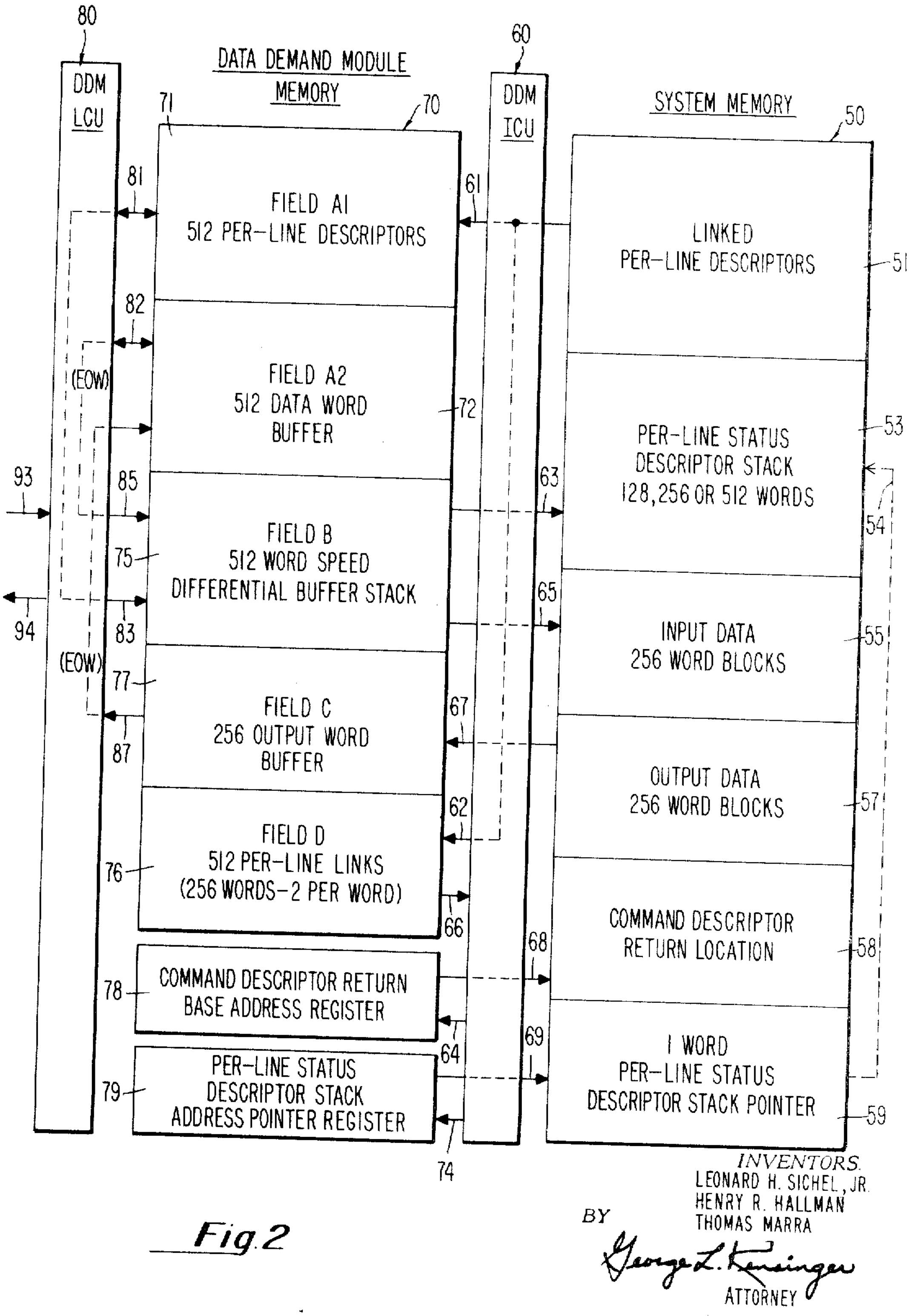
FIG. 2 is a schematic block diagram of the components of the communications control or data demand module of the invention, a portion of the main memory of data processing or communications systems to which it may be connected and the information transfer paths therebetween.

In the schematic block diagram of FIGURE 2 there is shown in the data demand module memory 70 fields B, C, and D which form a part of the subject invention, in addition to field A1 and A2 for the storage of a per-line channel control word or descriptor and a full data word for each input-output channel of the system. Field B provides a speed differential buffer stack of statistically determined size, which is used for first-in-first-out storage of control word and full input data word transfer to the system main memory. Field C is a line-oriented portion of the data demand module memory for the storage of at least one full data word for each output channel to be serviced and field D is a line-oriented portion of the data demand module memory for the storage of a descriptor link address or per-line link for each of the input-output channels to be serviced. In the preferred embodiment each word in Field D contained a descriptor link address for an input and an output channel and, therefore, Field D 256 words for storing links for 512 input-output channels.

It should be noted that a portion of Field B could be used as a stack for storing only control words or descriptors awaiting transfer from the data demand module and a separate portion thereof could be utilized for the storage of full input data words also awaiting transfer to a system memory or other storage device such as a disc file, in which case the data words in the latter portion of Field B would be linked by channel number, for example.

In the operation of the invention per-line channel control words or descriptors are transmitted from Field 51 in the system memory 50 through the data demand module system memory interface control unit 60 to descriptor Field 71 of data demand module memory 70 over information transfer path 61. The associated descriptor link addresses are then transmitted over bus 62 by the interface control unit to per-line link Field 76 of the DDM (data demand module) memory. Upon the detection of a ready or flag signal from a scanned input or output channel on input 93, DDM line control unit 80 withdraws the appropriate descriptor over interconnection 81, withdraws the appropriate data word over transfer path 82, transfers a byte or character of information, down-counts a descriptor and returns it to Field A1 unless this completes the transfer of a word of data in or out of the module or the transfer of a block of input or output data. In either of these events, the description, instead of being returned to Field A1, is inserted into speed differential stack 75 of the DDM memory over transfer path 83. The actual data transfers between the DDM and the input and output channels over data transfer paths 93 and 94 are made to or from a data word buffer over transfer path 82 which is stored in data word buffer 72 of the DDM memory, fully assembled input data words being inserted into speed differential stack 75 over connection 85 rather than being returned to the associated data word buffer. This input data word entry is placed into the position following the location at which the down-counted descriptor for that input channel was inserted. Upon the distribution of a full data word on an output channel over output conductor 94, a new output data word is transferred to the appropriate data buffer word in Field 72 over data transfer path 87 from output word buffer 77 of the DDM memory.

The data processing or communications system may also transmit an instruction to the data demand module by a command descriptor for interrogating the status of the line, in which case, the appropriate descriptor, and the partially assembled data word from Field A2 if it is an input channel, are transferred directly back to the system memory.

The DDM system memory interface control unit 60 will, as it acquires access to the DDM local memory, extract the earliest inserted descriptor remaining in the differential buffer stack 75 and the input data word in the next location, if the descriptor related to an input line, and will perform the indicated program service in a series of steps. This may simply require the transfer of a full input data word over path 65 for storage in Field 55 of the system memory or the transfer of a full output data word from Field 57 of the system memory to output word buffer 77 of the DDM local memory over connection 67, or the transfer of a per-line status descriptor for storage in Field 53 of the system memory over path 63 and the transfer of a new link per-line channel control word or descriptor from Field 51 of the system memory to descriptor Field 71 of the DDM local memory over transfer path 61, if indicated.

The steps in this program service of end-of-word and end-of-block conditions, indicated by a descriptor and a data word stored in the speed differential buffer stack 75 of Field B of the DDM memory for input channels, are performed during a plurality of intervals interspersed between data transfer local memory access by the DDM line control unit for successively scanned input-output channels. If a large number of such terminal conditions occur between successive scans of a line or channel requiring end-of-word or end-of-block service, then program service for such conditions could cause that channel to not be scanned within its allowable wait-time. The probability of this happening is very small and is handled as an error condition. This delay in program service of such conditions is acceptable so long as an overflow does not occur in the speed differential buffer stack 75, the size of which is statistically determined. The next scheduled scan of the line will then result in the transfer of data specified by a new per-line channel control word or descriptor.

The data demand module also includes a command descriptor return base address register 78 for storing, under program control through path 64, the base address to which command descriptors are to be returned over transfer path 68 to system memory Field 58 upon the execution thereof, such descriptors being returned to different addresses relative to this base address depending upon the particular data demand module returning the command descriptor. Also included in each data demand module is a status descriptor stack address register for storing the address to which status descriptors are returned, originally set under program control through the interface control unit over conductor 74. The contents of this register are counted up by the interface control unit and transferred to Field 59 of the system memory over transfer path 69. The address reposing in Field 59 of the system memory points to the last field entry (54) in the per-line status descriptor stack Field 53 of the system memory for the information of the system scheduling program.

Figure 3:
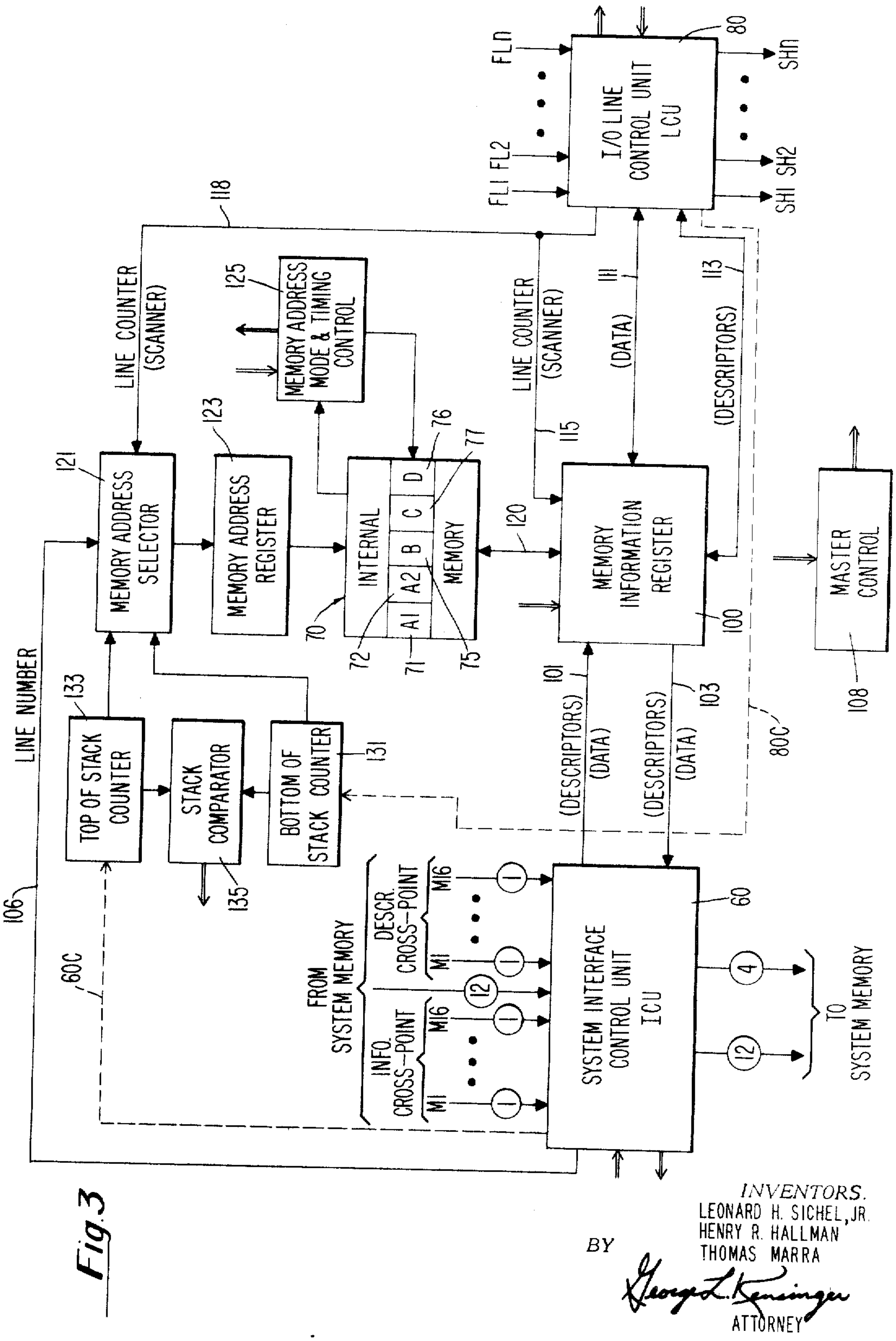
FIG. 3 is a schematic block diagram of the communications control or data demand module of the subject invention showing the local memory thereof in detailed schematic block diagram form.

In the schematic block diagram of the communications control or data demand module of FIGURE 3, the system memory interface control unit and the I/O line control unit are given the same designations as in FIGURE 2. The DDM local memory comprises internal memory 70 having Fields A1, A2, B, C and D designated 71, 72, 75, 77 and 76, respectively, memory information register

100 connected thereto over information transfer path 120, memory address selector 121, memory address register 123 and memory address load and timing control 125, together with top of stack counter 133, bottom of stack counter 131 and stack comparator 135.

Descriptors and data are written into the memory by the interface control unit when granted access over transfer path 101 and are read out of speed differential buffer stack field B (75) of the local memory over transfer path 103 as access is granted thereto for the performance of a program service step.

Data is transferred between line control unit 80 and the DDM local memory over transfer path 111 as local memory access is granted during the successive scanning of the input-output channels and descriptors are taken out of and restored back into Field A1 of the DDM local memory by the line control unit over transfer path 113 each time a byte or character of data is to be transferred and the associated descriptor is to be down-counted. The line number encoded by the line counter or scanner of the line control unit is supplied to DDM local memory address selector 121 for addressing the associated location in one of the line-oriented fields of the local memory and to the local memory information register over transfer path 115 for writing the line number into a condition report or status descriptor. These status descriptors are extracted from Field A1 of the DDM internal memory 70 for return to the system memory under program control through intermediate buffer storage in speed differential buffer stack 75 of the memory.

System memory interface control unit 60 stores the line number of the channel for which it is performing program service and also transmits it to local memory address selector 121 for addressing the local memory over transfer path 106.

Memory address selector 121 selects the field of the DDM internal memory to be accessed and memory address register 123 stores the address within the designated field to which access is to be had. Memory address mode and timing control 125 controls the mode of memory access to be performed such as full cycle read/write, split cycle read or write, or full cycle read/write with a third write operation for the writing of entries into the speed differential buffer stack 75 located in Field B of the local memory. It also controls the timing of the address cycles, such as conditionally granting the DDM system memory interface control unit a single cycle or double cycle access to the module memory.

Figure 4A:
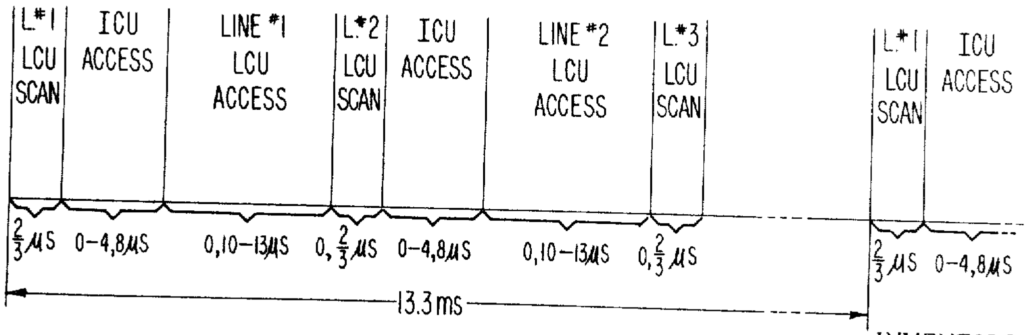
FIG. 4A is an illustration of one division of local memory access time between the line control unit and the interfrace control unit of a communications control module which may be effected in the subject invention.

In FIGURE 4A is illustrated one example of the interspersed manner in which local memory access time may be divided between the line control unit and the interface control unit of a communications control unit by memory address mode and timing control means 125 of the subject invention. In the example given, a line such as line #1 is scanned by the line control unit in approximately ⅔ microsecond, and if a ready or flag signal is detected on the scanned channel then a single cycle access to local memory by the interface control unit is permitted which may utilize between zero and four microseconds of local memory access time depending upon whether there are presently any entries in speed differential buffer stack 75 or any other outstanding program service for the ICU to effect. A period of 10 to 13 microseconds is then granted to the LCU for a full cycle read/write operation, a third write operation if it is necessary to make an entry into the speed differential buffer stack Field B, as when an end-of-word or end-of-block condition occurs, and LCU scan of the next succeeding channel or line.

If the scan of line #1, however, indicated no ready or flag signal for the transfer of data, then a double cycle local memory access is granted to the ICU for performing two steps of outstanding program service which may, for example, require up to eight microseconds, after which no access is given to the line control unit since the line had indicated that it was not ready for a data transfer.

Whether or not a data transfer is effected upon a line just scanned, after an ICU single or double cycle access has been granted, the next adjacent line is scanned and the process is repeated with alternate local memory access being granted to the line control unit and the interface control unit for the performance of data transfers and successive steps of program system memory transfers. In the preferred embodiment of the invention in which 512 input/output lines were serviced, a full scan cycle was completed in approximately 13.3 milliseconds, after which a new scan cycle was initiated and the process was repeated indefinitely.

Returning to FIGURE 3, line control 80 counts up bottom of stack counter 131 as indicated by the dashed control line 80c each time it makes a descriptor or input data word entry into speed differential buffer stack 75 of the internal memory and the system memory interface control unit 60 upcounts top of stack counter 133 as indicated by dashed control line 60c upon removing a descriptor or input data word therefrom. Stack comparator 135 continuously compares the count appearing in the cyclical bottom of stack counter 131 and the cyclical top of stack counter 133 and provides a control signal which, through master control 108 provides a signal to the ICU and the LCU as to whether the speed differential buffer stack is empty, contains some entries, or is full. During the course of operation it is normal for the speed differential buffer stack to be either empty or to contain some descriptor and input data word entries. The size of the speed differential buffer stack 75 is statistically calculated so that it should never become full and overflow which would indicate that the data demand module is over-loaded and would result in the sending of the signal to the data processing system of that fact.

Top of stack counter 133 is counted up by the system memory interface control unit each time it withdraws an entry from the stack. The procedure by which the line control unit counts up the bottom of stack counter upon making an entry for an output line or a pair of entries for an input line is more complex, however, and will be explained in greater detail with reference to FIGURE 4B of the drawings.

Figure 4B:
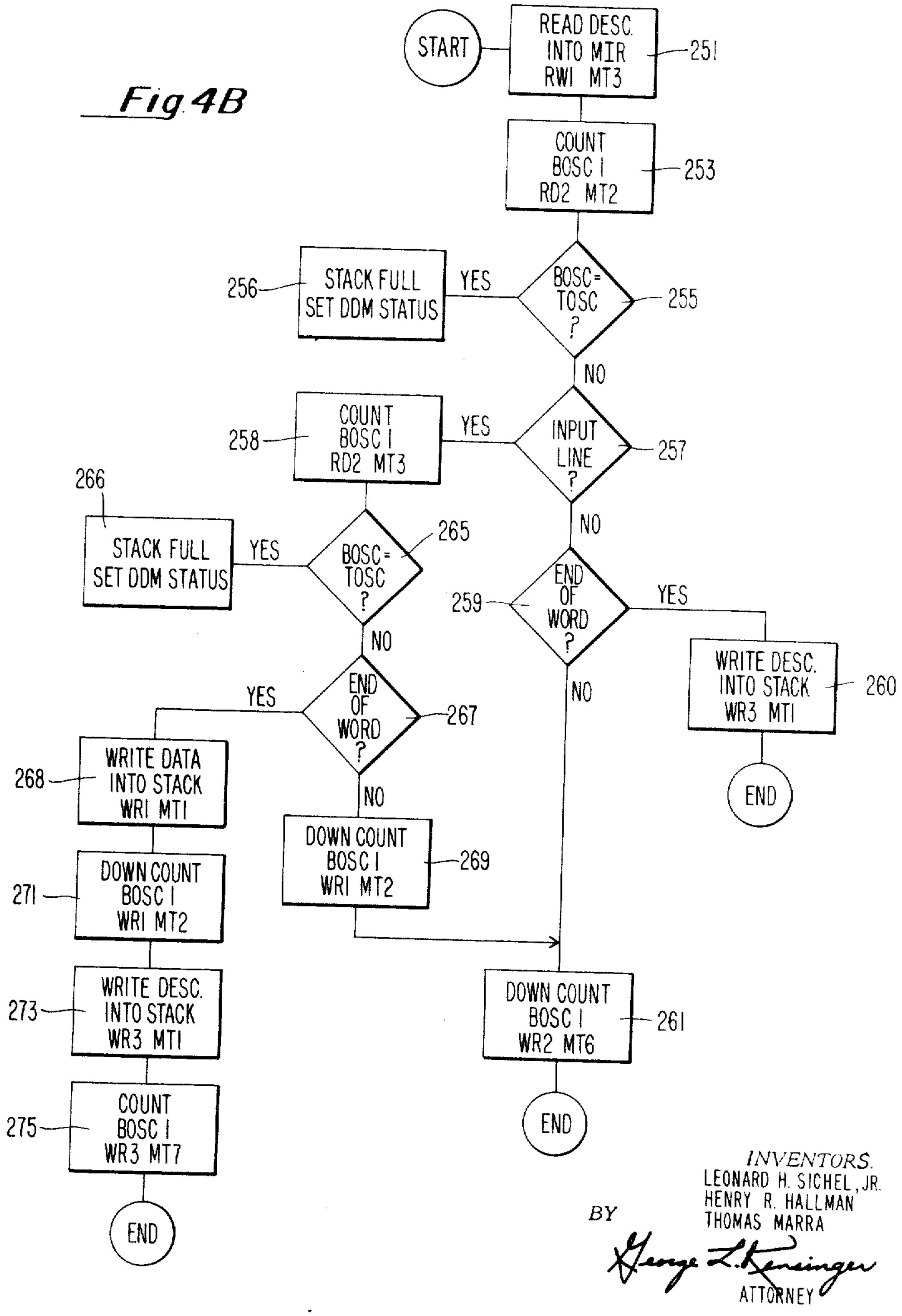
FIG. 4B is a flow chart showing the procedure by which the line control unit of the communications control module of the subject invention counts up the bottom of stack counter (BOSC) shown in FIGS. 3 and 5, as it enters channel control words and input data words into the buffer stack of the communications control module local memory.

In the flow chart of FIGURE 4B, which illustrates control of the bottom of stack counter by the line control unit, there appear references to points in time such as RW1 MT3, RD2 MT2, and RD2 MT3 which are points within a full cycle read/write local memory operation under control of memory address mode and timing control 125.

Upon the detection of an active per-line descriptor on an input-output channel, the associated descriptor is read into the memory information register at time 251 and the bottom of stack counter is counted up by one at time 253. Stack comparator 135 is sampled at 255 and if the entries in the bottom of stack counter and the top of stack counter are equal, a DDM status signal flip-flop (not shown) is set because the stack is full of end-of-word, or end-of-block transfer entries, or both. If BOSC is not equal to TOSC the procedure continues.

If it is an input line as tested at 257, then the bottom of stack counter is counted up by one at time 258. The stack comparator is again sampled at 265 and the stack full status flip-flop is set at 266 if equality is detected. A determination is then made at 267 as to whether an end-of-word condition has occurred. If it has, the data word is written into the stack at time 268, the BOSC is down-counted by one at time 271, the descriptor is written into the stack at time 273, and the BOSC is counted up by one at time 275 and the routine ends.

If it was an input line, but not an end-of-word condition as determined at 267, then the bottom of stack counter is counted down by one at time 269 and again counted down by one at time 261 and the routine ended.

If it was determined at 257 that it was not an input line and it was determined at 259 that it was also not an end-of-word condition, then again, the BOSC is counted down at time 261 and the routine ended.

If it was not an input line, that is to say that it was an output line, and if an end-of-word condition occurred as determined at 257 and 259, then the associated descriptor is written into the stack at time 260 and the routine ended.

The procedure and routines illustrated in the flow chart of FIGURE 4B for counting of the BOSC by the line control unit is for recording two entries in speed differential buffer stack 75 for an input line which are the control word or descriptor, in its then present form, followed by an input data word in the next location. For an output line its descriptor, in the then present form, is simply entered into the stack and the BOSC counted up by a net of one count to record the fact of the entry. Otherwise, no entries are made into the stack nor is any net change effected in the count of the BOSC by the line control unit. It should be noted that the flow chart of FIGURE 4B is merely illustrative and that other appropriate procedures could be followed for the counting of a BOSC by the line control unit of a communications control module constructed in accordance with the subject invention.

FIGURES 5A and 5B, when fitted together as shown in FIGURE 5, provide a detailed schematic block diagram of a communications control or data demand module constructed in accordance with the subject invention. The labels and numerical designations of the components of the communications module local memory, as well as the interconnections between the local memory and the other units, are substantially the same as in FIGURE 3, discussed above. The operation of the local memory components illustrated in FIGURE 5 is also identical to that described in connection with FIGURE 3. It should be understood that the line number of an input-output channel being serviced by the interface control unit may be delivered to local memory address selector 121 from system memory output register 151 over path 105 or from line number register 155 over information transfer path 107.

The apparatus on the left-hand portion of the figure, including instruction register 159, represents the system memory interface control unit of the data demand module. Data is received over one or more data busses into memory input selector 140 and from there is transferred into bus input register 141 and hence into input control register 142. The input control register and bus input register are interconected by conductor 143 for effecting end-around shifts of information such as descriptors brought into the module.

Status descriptor stack address register 145 and command descriptor base address register 147 are loaded directly from bus input register 141 under the control or command of the system program. Data and descriptors received from a system memory are transmitted from bus input register 141 to input control register 142 and are transmitted over transfer path 101 to local memory information register 100 for insertion into the appropriate local memory fields. Interrupt register 150 serves as an interface control unit command register. Any task that must be performed by the ICU other than servicing data requests from the line control unit is stored in this register, which is also outputted into system memory output register 151. This information may also be transmitted to the memory output register from bus input register 141, status descriptor stack address register 145 and the DDM local memory, over information transfer path 103.

System memory output register 151 may output information into system memory address selector 149 for addressing a system memory address location specified by a channel control word or descriptor field and also output information into system memory syllable selector 157 for transferring information to the system memory and into local memory address selector 121 over data transfer path 105. System memory address selector 149 also receives input information from status descriptor stack address register 145 and command descriptor base address register 147 and stores the system memory address to be accessed in system memory address register 153. Line number register 155 stores the number of the input-output channels being given program service by the ICU which is required primarily for directing line-number-oriented accesses to appropriate locations in Field C of the local memory and the storage of linked per-line descriptor addresses in Field D. The contents of interface control unit instruction register 159 determine how the ICU execute register and subcommand counters (not shown) will perform. Its inputs are decodes from bus input register 141, system memory output register 151, and stack comparator 135 and its outputs are command signals to be utilized in the module.

The interface control unit portion of the data demand module is similar in many respects to the analogous portion of the data demand module illustrated in the above-identified Lynch et al. application, Ser. No. 313,591. Also, reference is made to the description of the equivalent portion of the input-output control module described in Hallman et al. application, Ser. No. 241,421, filed on Nov. 30, 1962 for "A Data Processor Input-Output Control System," now U.S. Patent No. 3,274,561, for a more detailed description of the interface connections and mode of operations of an input-output control unit and the system memory of a data processing system with which the present invention may be utilized.

The DDM line control unit includes input buffer register 170 which receives data from flag selector and decoder 181 over data transfer path 171 and transmits characters and bytes of information into local memory information register 100, which exchanges a data buffer word with Field A2 of internal memory 70. Output buffer register 172 receives output characters or bytes of information from local memory information register 100 over data transfer path 112 and transmits the same over transfer path 173 to shift selector and encoder 183 for distribution a bit at a time to the appropriate output channel. Descriptor register 175 is utilized by the line control unit for temporarily storing a descriptor or channel control word brought out of Field A1 of the internal memory 70 for directing an information transfer on an input or output channel, after which it is restored to the local memory.

Line counter 193 is operated by scan control 191 for scanning the input-output lines in the desired sequence. It is connected to line decoder 194, group decoder 195 and set decoder 196 and thence to shift selector and decoder 183 and flag selector and decoder 181 for providing differential scanning of both fast and slow speed input-output devices. The scanning operation, with provision for differential scanning of different speed input-output lines, is similar to that described in the above-identified Lynch et al. application, Ser. No. 313,591. The line number contained by line counter 193 is also transmitted over path 115 to local memory information register 100 and over transfer path 118 to local memory address selector 121 for local memory addressing purposes. Master control 108 provides general control signals and levels to the components of the communications control or data demand module which it generates upon decoding information appearing in various ones of the registers and components of the module.

FIGURE 6A illustrates several forms of line channel control words or descriptors and FIGURE 6B indicates the information and instructions which may be transmitted thereby for use in the communications control module of the subject invention. Descriptor 201 is an example of a channel control word or per-line descriptor as it is received by the data demand module from the system main memory. Descriptor 203 illustrates the portion of a newly received per-line descriptor that is stored in Field A1 of the DDM local memory upon being received by the interface control unit from the system memory. Local memory word 205 contains locations for the storage of a descriptor link address for one of the output lines and for one of the input lines which are "stripped off" the per-line descriptor when it is received by the interface control unit from the system memory.

Descriptor 207 is an example of a complemented per-line descriptor as stored in Field A1 to which has been added information regarding line status, bit and character counters, and various line control unit tags. Descriptor 209 is a per-line condition report status descriptor which is returned to Field B the system memory to speed differential buffer stack 75 from Field A1 of the local memory for reporting the occurrence of conditions such as an end-of-block condition or end-of-word condition. Descriptor 211 is a per-line interrogated status descriptor which is transferred from Field A1 of the module local memory directly to the appropriate location in the status descriptor stack in the main memory of the system to which the module is connected.

Tables 221, 223, 225, 227 and 229 of FIGURE 6B illustrate the significance of the descriptor fields designated job tags, per-line status, LCU tags, operation codes, and formats, respectively, in the descriptors illustrated in FIGURE 6A. Of course, other channel control words and descriptors including command descriptors for transmitting instructions from a system to a communications control module and set-up descriptors for initially loading certain registers in the communications control module are also utilized in the operation of such a module and may convey additional instructions and information to or from the data demand module.

An examination of information transmitted in the per-line channel control words or descriptors indicates the manner in which information transfers may be controlled on the associated input-output communications channel.

Although there have been shown and described only certain specific communications control module operations and interconnections, it will be apparent that many more operations and interconnections are possible without departing from the spirit of the present invention. And while the preceding detailed description has been directed primarily to the illustrative embodiment of the invention, it is not to be restricted thereby since obviously many modifications and variations of the present invention are possible in the light of the above teachings. It is therefore to be understood that within the scope of the appended claims the invention may be practiced otherwise than as specifically described.

What is claimed is:

1. A communications control module for controlling data transfers on a plurality of input/output channels or lines in an electronic data communications system having a main memory, comprising, local memory means having a line-oriented field for storing a channel control word or descriptor and a data buffer word for each of said channels, a line control unit coupled to said local memory means and having means for substantially periodically scanning each of the channels at least once in every scan cycle and for transferring bytes of data into and out of the data buffer words in the local memory means through the input and output channels, respectively, when they are ready, system memory interface control means coupled to said local memory means for transferring new per-line channel descriptors and output data words from the system memory to appropriate locations in the local memory means and for transferring condition report descriptors and input data words from the local memory means to the system main memory, and local memory control means for alternately granting local memory access to the line control unit and to the memory interface control means for interlacing the transfer of data bytes on successive input-output channels and the transfer of descriptors and data words to and from the system main memory.

2. The communications control module of claim 1 wherein the line control unit comprises means reponsive to channel control descriptors received from the system main memory which comprise a field for identifying the system memory address to which or from which the next data word is to be transferred for an output or input channel, respectively, and the line control unit updates this address field after each transfer of a data word.

3. The communications control module of claim 1 in which the local memory control means includes means to grant a single cycle local memory access to the interface control means if a ready signal is detected on the input or output channel last scanned by the line control unit and to grant a double cycle local memory access if no such ready signal was detected on the last scanned channel.

4. The communications control module of claim 1 wherein the local memory control means includes mode control means for granting to the interface control means single cycle or double cycle local memory access depending upon whether a byte of a data is to be transferred or not on the channel last scanned by the line control unit, and means for granting local memory acces to the line control unit for the transfer of data on the scanned channel if indicated to be ready by a signal received from the channel when scanned.

5. The communications control module of claim 2 wherein the interface control means includes means responsive to a channel control descriptor received from the system main memory which includes a field for transmitting the system memory link address of the next descriptor to be executed for controlling data transfers on the associated channel.

6. The communications control module of claim 5 wherein the local memory means comprises a line-oriented field for storing the channel descriptor system memory link addresses transmitted in the channel control descriptors as received from the system main memory.

7. The communications control module of claim 6 wherein the line control unit comprises means for inserting a bit counter, character counter, and status field into the channel control descriptors stored in the line-oriented descriptor field of the local memory responsive to controls received from the system.

8. The communication control module of claim 5, wherein the local memory means further comprises a first-in-first-out speed differential buffer stack for storing requests for new channel control descriptors and for storing condition report descriptors which require information transfers between the local memory means and the system main memory by the interface control means.

9. The communications control module of claim 8 wherein the local memory control means further comprises a bottom of stack counter which is updated by the line control unit upon inserting an entry into the speed differential buffer stack, a top of stack counter which is updated by the system memory interface control means upon extracting an entry from the buffer stack, and stack counter comparator means coupled to both counters for determining whether or not the stack contains an entry to be extracted and transferred to the system memory by the interface control means.

10. The communications control module of claim 8 wherein the line control unit comprises means to insert input data words into the local memory buffer stack along with the associated channel control descriptor for requesting the transfer of input data words to the system main memory by the interface control means.

11. The communications control module of claim 8 wherein the line control unit comprises means to request that new output data words be obtained from the system main memory through the interface control means by inserting the associated channel control descriptors into the local memory buffer stack.

12. The communications control module of claim 11 wherein the local memory means further comprises a line-oriented field for the storage of at least one output data word which is obtained from the system main memory by the memory interface control means for each of the output channels and which is transferred into the data buffer word line-oriented field in the local memory means upon completion of the transfer of the preceding output data word on the associated channel.

13. The communicaitons control module of claim 8 wherein the line control unit comprises means to request that new channel control descriptors be obtained from the system main memory through the interface control means by inserting the preceding fully executed channel control descriptors for the associated channels into the local memory buffer stack.

14. The communications control module of claim 9 wherein the stack counter comparator means includes means for determining whether or not the speed differential buffer stack is filled with entries and for signalling the system if its is filled.

References Cited

UNITED STATES PATENTS

| | | | |
|---|---|---|---|
| 3,293,612 | 12/1966 | Ling | 340—172.5 |
| 3,302,182 | 1/1967 | Lynch et al. | 340—172.5 |
| 3,312,945 | 4/1967 | Berezin et al. | 340—172.5 |
| 3,337,855 | 8/1967 | Richard et al. | 340—172.5 |

RAULFE B. ZACHE, Primary Examiner